(12) United States Patent
Würsching et al.

(10) Patent No.: US 6,445,131 B1
(45) Date of Patent: Sep. 3, 2002

(54) COMPACT FLUORESCENT LAMP WITH BUILT-IN OPERATING CIRCUIT

(75) Inventors: István Würsching; Ferenc Papp; József Fülöp, all of Budapest (HU)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/572,125

(22) Filed: May 17, 2000

(51) Int. Cl.$^7$ ................................. H01J 13/46
(52) U.S. Cl. .................... 315/56; 362/373; 313/318.01; 313/318.08
(58) Field of Search .................. 315/56–58, 50, 315/32, 33, 224; 362/373, 294, 265, 264, 267, 221, 362; 313/47, 27, 493, 634, 318.01, 318.02–318.08

(56) References Cited

U.S. PATENT DOCUMENTS

| | | | |
|---|---|---|---|
| 4,503,360 A | * | 3/1985 | Bedel .......................... 315/112 |
| 4,695,767 A | | 9/1987 | Wittmann ..................... 315/58 |
| 5,751,105 A | * | 5/1998 | Cserteg et al. .............. 313/493 |
| 6,116,754 A | * | 9/2000 | Oscovai et al. ............. 362/260 |
| 6,204,602 B1 | * | 3/2001 | Yang et al. ................... 315/58 |

* cited by examiner

Primary Examiner—Haissa Philogene
Assistant Examiner—Ephrem Alemu
(74) Attorney, Agent, or Firm—Fay, Sharpe, Fagan, Minnich & McKee, LLP

(57) ABSTRACT

A compact fluorescent lamp comprises at least one discharge tube (2) convoluted to have discharge tube legs substantially parallel to a longitudinal axis. At least two of the discharge tube legs include lead-in-wires (6). The lamp also comprises a plastic cap (4) which is a hollow body defined by a cover wall (42) receiving the discharge tube legs through holes (26) formed therein and a side wall (44). A bonding material is applied between the discharge tube legs and an inside portion of the cover wall (42) of the plastic cap (4). The bonding material requires a heat treatment for setting. A ballast circuitry is located at least partly on a circuit board (22). A plastic insert piece (12) is disposed in the plastic cap for holding the circuit board (22) substantially perpendicularly to the longitudinal axis at a distance from the discharge tube legs. The lamp further comprises a base housing (28) which includes a base shell (30) and connects to the side wall (44) of the plastic cap (4).

9 Claims, 5 Drawing Sheets

COMPACT FLUORESCENT LAMP WITH BUILT-IN OPERATING CIRCUIT

FIELD OF THE INVENTION

This invention relates to a compact fluorescent lamp comprising a circuit board with an operating circuit, and, more particularly, to a construction for holding the circuit board in the lamp.

BACKGROUND OF THE INVENTION

Low-pressure discharge lamps compatible with incandescent lighting fixtures, the so-called compact fluorescent lamps, include an operating circuitry necessary for their operation. This electronic ballast is placed in the base housing between the threaded or bayonet lamp base shell and the cap holding the discharge tubes. As a consequence, it increases the size of the lamp. This increase in size is disadvantageous from the point of view of the application of the lamp, so it is desirable to make this increase smaller. One way of size-reduction is to increase the operating frequency which results in an operating circuitry smaller in size. However, the increase of frequency is limited by interference elimination standards protecting the environment from electromagnetic radiation. Another way of reducing the size of the circuitry is securing the circuit board supporting the electronic ballast perpendicularly to the longitudinal axis. Such an arrangement is described in U.S. Pat. No. 4,695,767. This patent illustrates that the exhaust tubes extending from the discharge tubes must be taken into account if the circuit board is placed perpendicularly to the longitudinal axis of the lamp. The sealed ends of the exhaust tubes must not knock against either electronic components or the printed circuit board supporting the mounted electronic components. In order to avoid this, a hole should be cut in the printed circuit board at the place where the exhaust tube is extending just as it is shown in the above patent. Such holes, however, make the surface of the printed circuit board where components can be mounted smaller. This fact in turn will require a larger size of the printed circuit board, and will result in a wider lamp. This problem can be resolved if the side wall of the plastic cap supporting the printed circuit board is made longer, i.e. long enough to keep the ends of the exhaust tube at a sufficient distance from the circuitry and its printed circuit board. This solution has the disadvantage that during the heating necessary for the setting of the cement fixing the discharge tube ends, the longer side wall of the cap can get deformed uncontrollably. The danger of deformation can be reduced by using a longer heating session of a lower temperature, but this increases the cycle time of manufacturing.

Thus there is a particular need for a compact fluorescent lamp structure that brings a solution to the above problem. That is, a construction for compact fluorescent lamps containing an electronic ballast is required that permits to safely perform the setting of the cement fixing the discharge tube to the cap even if the electronic ballast is mounted on a printed circuit board which is perpendicular to the longitudinal axis of the lamp.

SUMMARY OF INVENTION

In an exemplary embodiment of the invention, a compact fluorescent lamp comprises at least one discharge tube convoluted to have discharge tube legs substantially parallel to a longitudinal axis. At least two of the discharge tube legs include lead-in-wires. The lamp also comprises a plastic cap which is a hollow body defined by a cover wall receiving the discharge tube legs through holes formed therein and a side wall. A bonding material is applied between the discharge tube legs and an inside portion of the cover wall of the plastic cap. The bonding material requires a heat treatment for setting. A ballast circuitry is located at least partly on a circuit board. A plastic insert piece is disposed in the plastic cap for holding the circuit board substantially perpendicularly to the longitudinal axis at a distance from the discharge tube legs. The lamp further comprises a base housing which includes a base shell and connects to the side wall of the plastic cap.

One advantage of this construction is that the use of the plastic insert piece permits shortening the side wall of the plastic cap since the insert piece is the component part which holds the circuit board at a distance from the discharge tube legs rather than the side wall of the cap. This distance is sufficient to avoid harmful interference between the tube legs and the circuit board. Owing to the shortened side wall of the cap, the bonding material applied to an inside portion of the cover wall of the cap can be set by a heat treatment where the source of the heat is closer to the bonding material. Consequently, a shorter heating session is required for setting the bonding material and the side wall of the cap and the elements thereof required for connecting to the base housing will not get deformed by the heat uncontrollably.

Another advantage is that the use of the insert piece results in the shortening of the plastic base housing of the lamp.

A further advantage is that the plastic insert piece can be exploited for other purposes which will be explained in the detailed description of the invention.

DETAILED DESCRIPTION OF THE INVENTION

Figure 1:
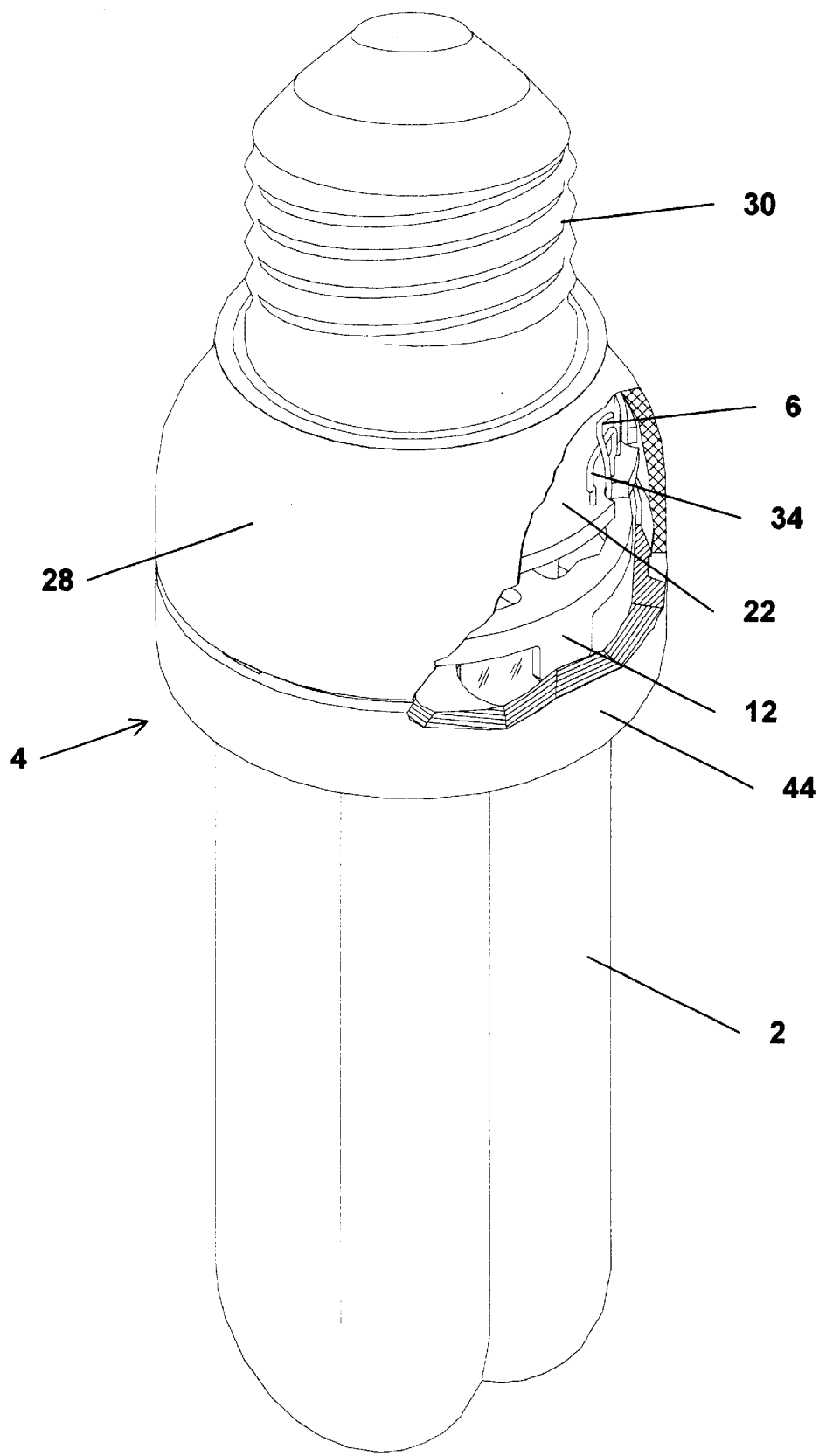
FIG. 1 shows a compact fluorescent lamp in which the present invention is embodied.

FIG. 1 shows a fully assembled compact fluorescent lamp which includes a discharge tube 2, a cap 4, a base housing 28 and a base shell 30. The broken out section shows partly the cap 4 and partly the base housing 28. The base housing 28 together with the base shell 30 is mounted on the previously mentioned components. The base shell 30 shown in the figure is of threaded structure, but other types of lamp base shells, for example bayonet base shells still remain within the scope of the present invention. It is shown in the figure that under the base housing 28 equipped with the base shell 30, lead-in-wires 6 of the discharge tube 2 are bent in a way that they can lean against contact terminals 34 built into a printed circuit board 22. The lead-in-wires 6 and the corresponding contact terminals 34 are welded to each other. The base housing 28 connects to a side wall 44 of the cap 4.

Figure 2:
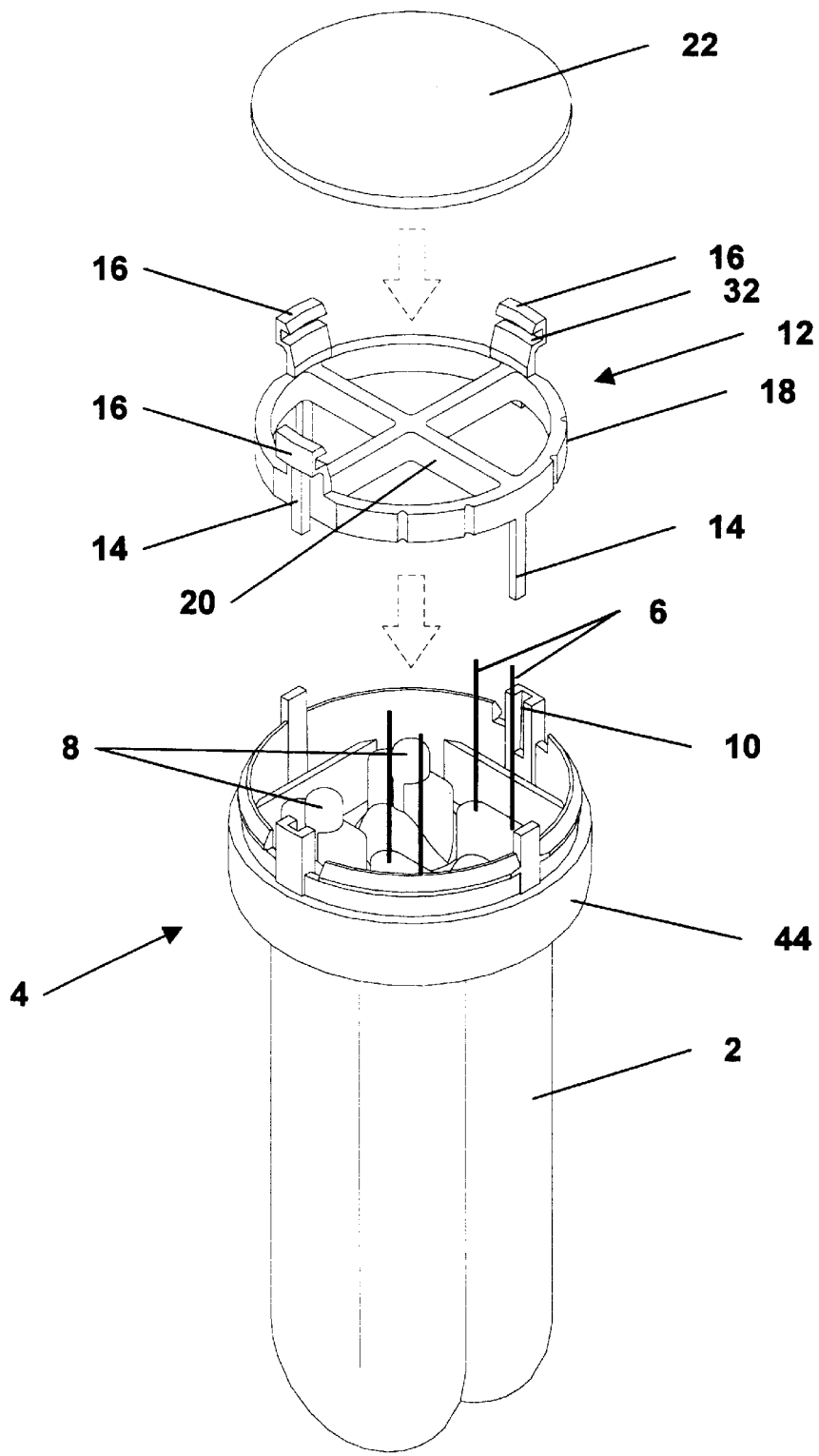
FIG. 2 shows the compact fluorescent lamp of FIG. 1 during assembly.

In FIG. 2, the compact fluorescent lamp is shown in the phase of assembly when the discharge tube 2 is already fixed to the cap 4. Up to this phase, the lamp making process corresponds to the known manufacturing processes. This means that the discharge tube 2 is coated with phosphor on the internal surface, equipped with cathodes and provided with the lead-in-wires 6, filled with discharge gas and sealed at its ends. The ends of the discharge tube 2 extend through holes formed in and are fixed to the cap 4. Their fixing is accomplished with basing cement which can be set when heated. An adhesive bond is established between an inner surface of the cap 4 and the ends of the discharge tube 2. The discharge tube 2 itself includes substantially parallel tube legs, and each pair of tube legs is formed by bending a tube section in 180°. It goes without saying that the discharge tube 2 can include more than four tube legs as well. Apart from the arrangement shown in the figure, an arrangement including six or eight legs is also rather frequent. Lead-in-wires 6 extend from two tube legs, and sealed exhaust tubes 8 extend from other two tube legs. One end of the lead-in wires 6 is connected to the cathode of the discharge tube 2, the other end of the lead-in-wires is connected to the operating circuit at a later phase of the assembly process.

As a next step, a plastic insert piece 12 is placed on this assembly. Legs 14 of the insert piece fit into slots 10 on the side wall 44 of the cap 4 as a result of an assembling operation accomplished parallel to the longitudinal axis of the lamp. The insert piece 12 in this embodiment is substantially a wheel-like disk comprising a ring 18 and ribs 20. The insert piece is also equipped with fingers 16 of approximately the same length as that of the legs 14 on its other side. The fingers 16 are suitable for fixing the printed circuit board 22 supporting the operating circuitry of the discharge lamp. This fixing is possible with the help of slots 32 formed at the end of the fingers 16 in a way that the printed circuit board 22 is snapped into the slots 32. One of the fingers 16 can be of a different structure where, instead of the slot 32, it has a support which holds the edge of the printed circuit board. The printed circuit board 22 in the figure is represented only by a board supporting the ballast circuit since the circuit elements themselves are not the subject of this invention.

Figure 3:
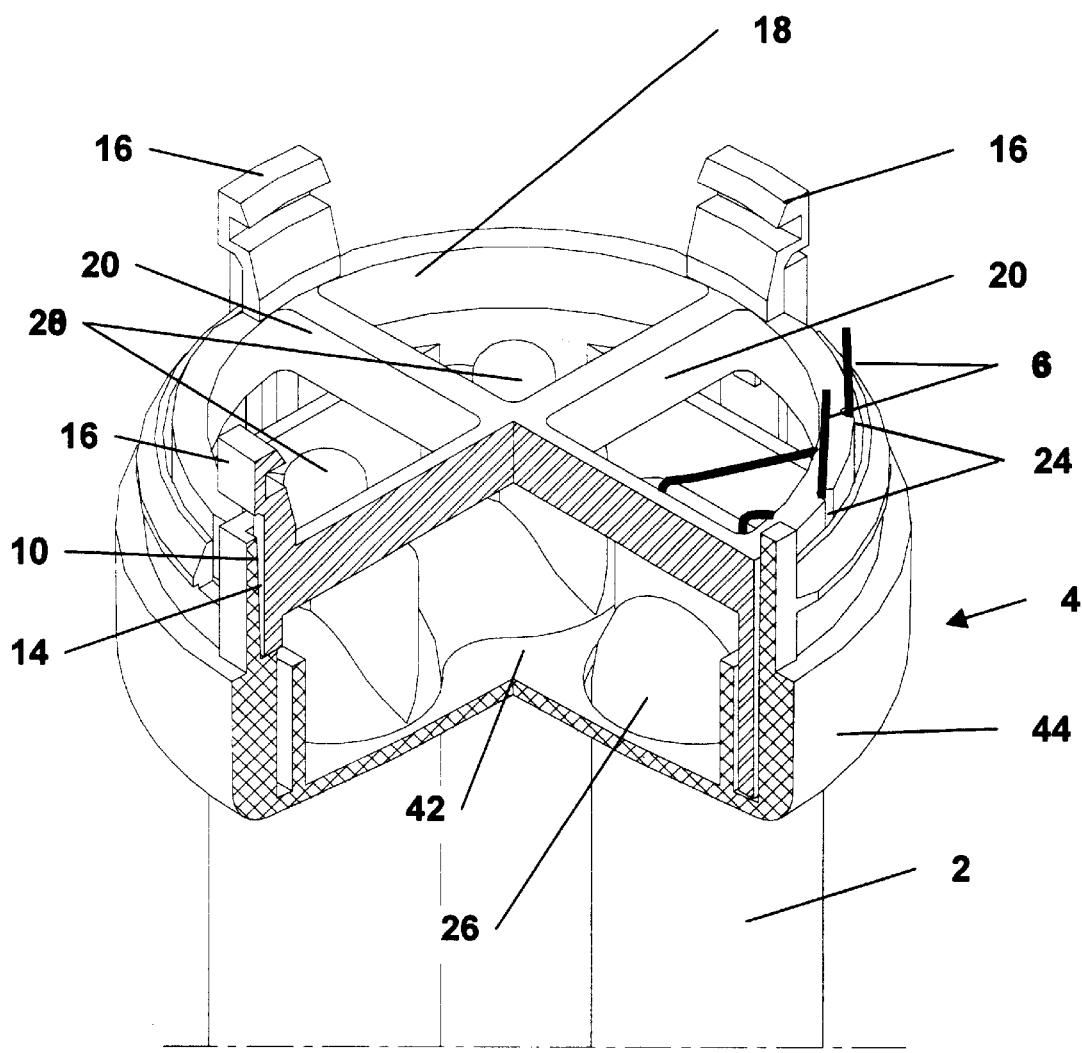
FIG. 3 shows the connection of a cap and an insert piece of the assembled lamp of FIG. 1 at a later stage of assembly.

FIG. 3 shows the assembled cap 4 and the fitted insert piece 12 in a broken out view. The cap 4 itself is a hollow body defined by a cover wall 42 and the side wall 44. In the course of the fitting operation, the legs 14 of the insert piece run into the slots 10 of the cap 4. At the same time, the lead-in-wires 6 fit into the indentations 24 on the perimeter of the ring 18 of the insert piece 12. Due to these indentations 24, the lead-in-wires 6 can be kept at a distance from each other by the insulating material of the insert piece 12 so that the short circuit of the lead-in-wires 6 is avoided. This is a further advantage of the present invention. The discharge tube 2 is fitted into holes 26 formed in the cover wall 42 of the cap 4. The discharge tube 2 is fixed in the cap 4 with a bonding material applied between the discharge tube legs and an inside portion of the cover wall 42. The ribs 20 of the insert piece 12 are positioned in a way so that these ribs avoid the ends of the exhaust tubes 8 sticking out of the discharge tube 2. With this arrangement further space can be saved in the longitudinal direction of the lamp.

Figure 4:
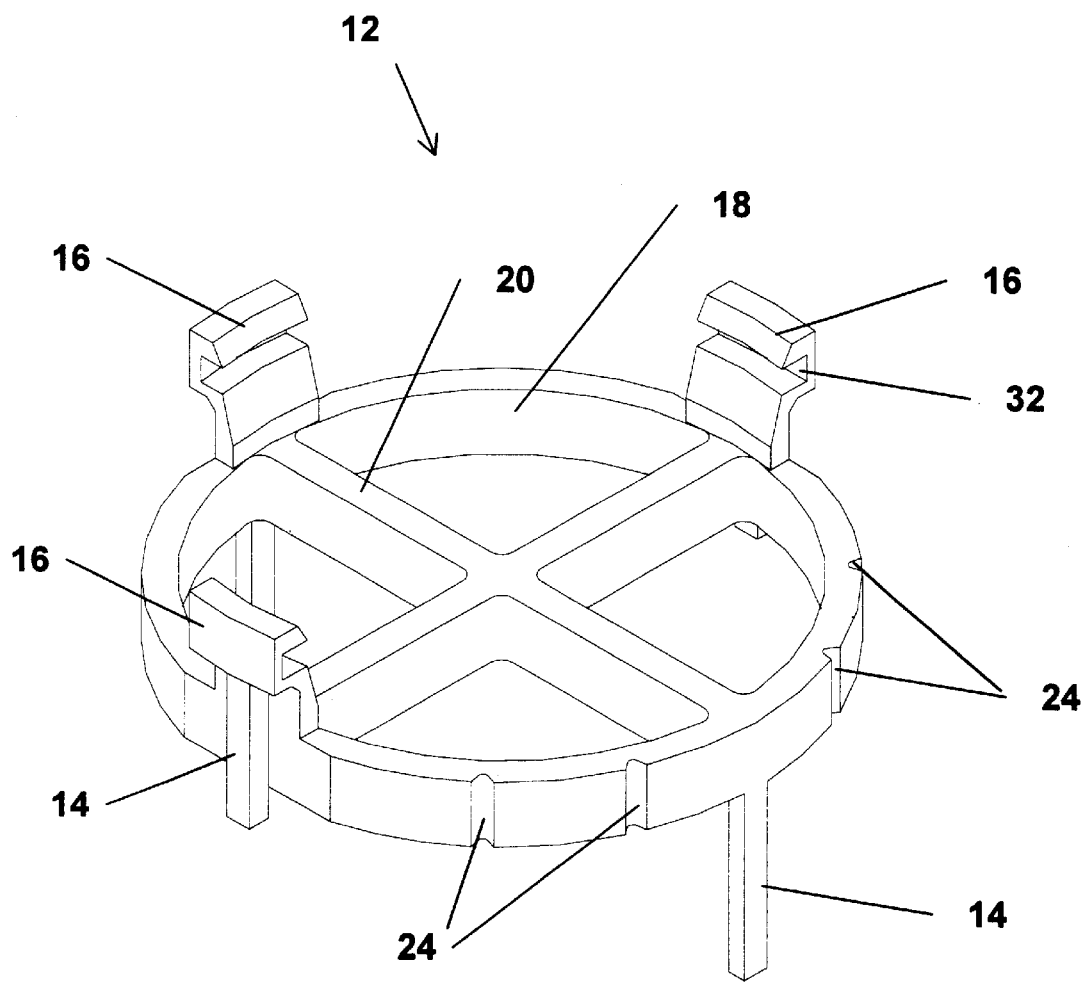
FIG. 4 shows an embodiment of the insert piece.

FIG. 4 shows a possible embodiment of the insert piece 12. In this enlarged drawing, it is evident that the insert piece 12 is substantially a planar body which comprises a ring 18 reinforced by radial ribs 20. In this embodiment, there are four ribs 20 but it is possible to make an insert piece with only one diametrical rib. On the perimeter of the ring 18, there are three fingers 16 extending in the direction of the longitudinal axis and defining cross-directional slots 32 suitable for fixing edge portions of the printed circuit board safely. Four indentations 24 extend parallel to the longitudinal axis of the lamp in an circumferential rim portion of the ring 18 for letting through the lead-in-wires 6 of the discharge tube 2 and preventing the lead-in-wires 6 from being short circuited. There are also four legs 14 on the perimeter of the ring 18, which extend in the opposite direction from the fingers 16. The length of the legs 14 corresponds to the depth of the slots 10 in the internal wall of the cap 4 which was described with reference to FIG. 3. The figure illustrates an advantageous embodiment of the insert piece 12, however another structure is also possible in which the insert piece 12 does not include the ring 18 and the ribs 20 but has the form of a disk.

Figure 5:
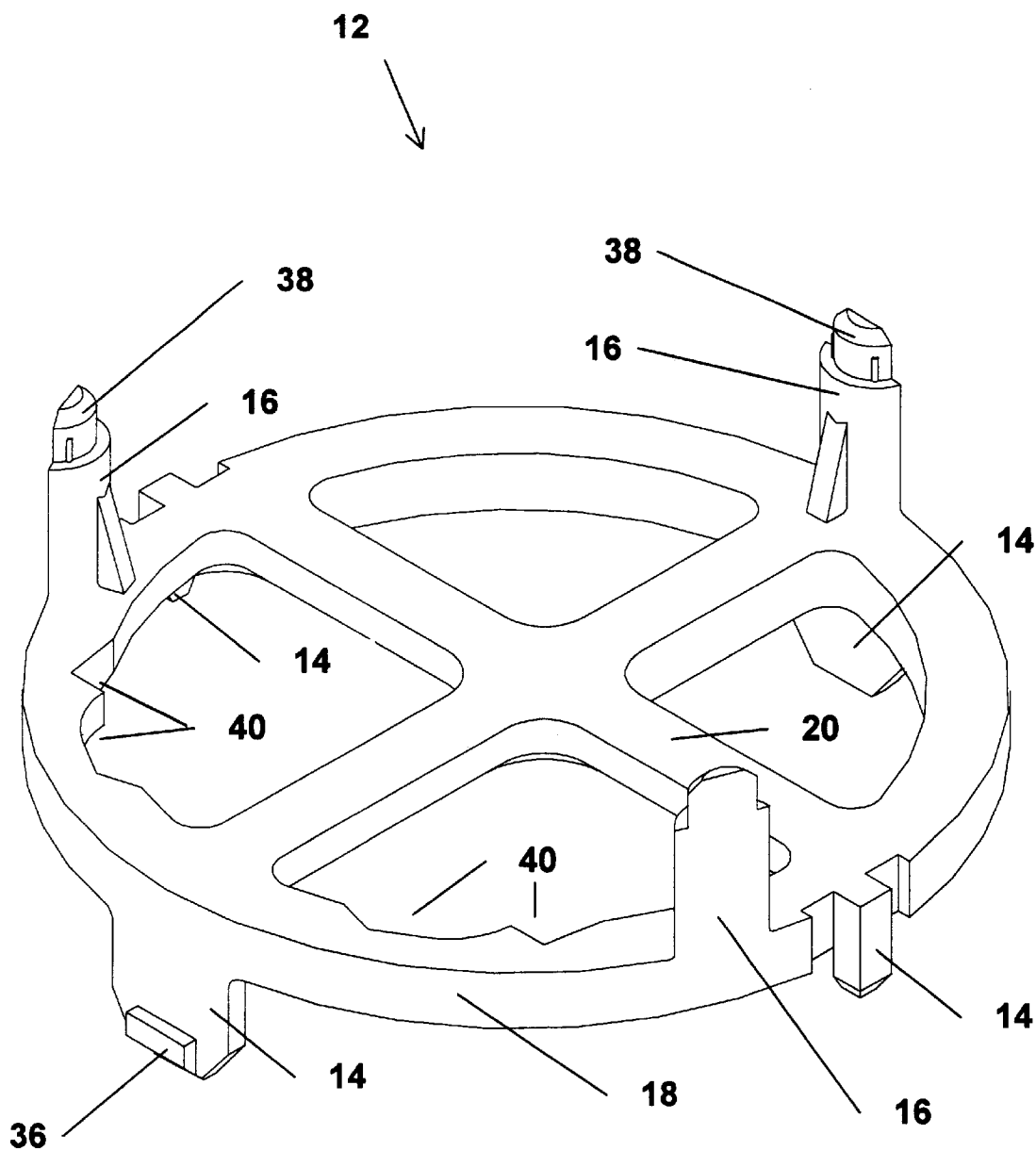
FIG. 5 shows another embodiment of the insert piece.

FIG. 5 shows a further preferred embodiment of the insert piece 12. According to this embodiment, the insert piece 12 similarly to the previous embodiment includes a ring 18 and ribs 20 formed in the middle of the ring 18 as well as fingers 16 on the ring 18 perimeter extending in one of the longitudinal axial direction and legs 14 extending in the opposite direction. The number of fingers is three and the number of legs is four in this embodiment, as well. The difference compared to the previously described embodiment is that there are no cross-directional slots at the ends of the fingers 16, but a stud 38 is formed at each finger end to support the printed circuit board. The stud 38 extends axially from each finger end for engaging the circuit board 22 with a snapping action at notches formed in an edge portion of the circuit board 22.

There is a change with regard also to the legs 14 compared to the embodiment of the insert piece 12 described previously. The legs 14 are shorter and some of them have protrusions 36 in an outwardly radial direction. When connecting the insert piece 12 to the cap 4, these protrusions 36 fit to the side wall 44 of the cap 4 thereby securing a fixing in axial direction. There are indentations 40 on the internal surface of the ring 18 of the insert piece 12 which receive the lead-in-wires 6 of the discharge tube 2 when these lead-in-wires 6 are let through the middle portion of the plastic insert piece 12 rather than the circumferential rim portion of the ring 18. The indentations 40 prevent the lead-in-wires 6 from being short circuited.

What is claimed is:

1. A compact fluorescent lamp comprising at least one discharge tube (2) convoluted to have discharge tube legs substantially parallel to a longitudinal axis, at least two of the discharge tube legs having lead-in-wires (6), a plastic cap (4) being a hollow body defined by a cover wall (42) receiving the discharge tube legs through holes (26) formed therein and a side wall (44), a bonding material applied between the discharge tube legs and an inside portion of the cover wall (42) of the plastic cap (4) and requiring a heat treatment for setting, a ballast circuitry located at least partly on a circuit board (22), a plastic insert piece (12) disposed in the plastic cap (4) for holding the circuit board (22) substantially perpendicularly to the longitudinal axis at a distance from the discharge tube legs, and a base housing (28) having a base shell (30) and connecting to the side wall (44) of the plastic cap (4).

2. The compact fluorescent lamp of claim 1 in which the plastic insert piece (12) is a substantially planar body, fingers (16) extend in one direction from the plane thereof for holding the circuit board (22) and legs (14) extend in the other direction for the disposition thereof in the plastic cap (4).

3. The compact fluorescent lamp of claim 2 in which the plastic insert piece (12) has a shape of a disc.

4. The compact fluorescent lamp of claim 2 in which the plastic insert piece (12) has a shape of a ring (18).

5. The compact fluorescent lamp of claim 4 in which the plastic insert piece (12) comprises stiffening means in the form of radial ribs (20) or at least one diametrical rib.

6. The compact fluorescent lamp of claim 2 in which each finger (16) has a slot (32) for engaging an edge portion of the circuit board (22) with a snapping action.

7. The compact fluorescent lamp of claim 2 in which each finger (16) has a stud (38) extending axially therefrom for engaging the circuit board (22) with a snapping action at notches formed in the edge portion thereof.

8. The compact fluorescent lamp of claim 2 in which the legs (14) are inserted into a slot (10) formed in the side wall (44) of the plastic cap (4).

9. The compact fluorescent lamp of claim 2 in which the plastic insert piece (12) has indentations (24) in an circumferential rim portion thereof for letting through the lead-in-wires (6) of the discharge tube (2) and preventing the lead-in-wires (6) from being short circuited.

* * * * *